United States Patent Office 3,262,802
Patented July 26, 1966

3,262,802
STABILIZED NACREOUS PIGMENT
William G. Young, Lake Mohegan, and Charles A. Quinn, Mahopac, N.Y., assignors to The Mearl Corporation, Ossining, N.Y., a corporation of New York
No Drawing. Continuation of application Ser. No. 504, Jan. 5, 1960. This application Mar. 12, 1963, Ser. No. 264,714
16 Claims. (Cl. 106—297)

This application is a continuation of application Serial No. 504 filed January 5, 1960, now abandoned.

This invention relates to the stabilization of nacreous basic lead carbonate against damage by acid-containing resins. Through the use of the invention, it is possible to achieve nacreous or pearlescent effects without impairment of the luster or brilliance inherent in the basic lead carbonate crystals, despite the tendency of acid-containing resins to effect such loss of luster.

Nacreous basic lead carbonate, a synthetic pearlescent pigment, consists of extremely thin, hexagonal plate-like crystals. These crystals are generally less than one micron in thickness and range from 5 to 50 microns in diameter. One method of preparing such crystals and a nacreous composition including same is described in United States Patent No. 2,950,981 owned by applicants' assignee. Nacreous basic lead carbonate crystals are also described in United States Patent No. 2,097,269.

The crystals, available commercially as pastes or suspensions in suitable vehicles, are incorporated in the plastics or resins used for coating, casting, or molding and such compositions produce a nacreous or pearly luster. In use, the translucent crystals are oriented parallel to one another in a light-transmitting plastic object or coating, and produce a pearly appearance by means of the simultaneous reflection of light from a multitude of parallel surfaces.

Many resins are derived from the polymerization of acids. These materials, including polyester resins and alkyd resins, generally contain titratable acid, which represents (a) end groups, (b) the residual monomer which failed to react in the polymerization reaction, or (c) free acid formed by partial degradation of the polymer. When basic lead carbonate is incorporated in such acidic material, there is a danger that the extremely thin crystals will be damaged by reaction with this acid.

The extent and rate of damage is often less than would be in the case if a given amount of basic lead carbonate were combined directly with a quantity of an acid equivalent to the free acid present in the resin. The resin exerts a protective action on the crystals, partly by modifying the reaction medium and by diluting the acid, and partly by specific interaction with the crystal surface to provide a more or less tightly bound layer which retards the acid attack.

The damaging effect of a given acidic resin, therefore, depends on a number of factors, which include the concentration of free acid, the nature of the acid, the composition of the resin, the molecular weight and configurations of the polymeric molecules, etc. In polyester casting, for example, in which 0.25 to 1.5 percent basic lead carbonate crystals are held in suspension in polyester resin for periods which may be as great as twenty-four hours or even longer prior to polymerization, some commercial polyester resins have little or no effect on the performance of the nacreous pigment, while others are so damaging as to convert the brilliant pearl sheen into a dull white. In some cases there is a loss in opacity caused by dissolution of the basic lead carbonate crystals.

The impairment of luster does not indicate in all cases that the basic lead carbonate crystals have dissolved; in some resins, the free acid has the effect of reacting with the platelets only so far as to modify the composition of the crystal surface. This type of modification may, however, lead to other undesirable and damaging effects, such as agglomeration or resistance to orientation. These defects also diminish luster, since pearlescent luster depends on reflection from many discrete, parallel surfaces.

The acids which interact with the basic lead carbonate crystals are generally the dibasic acids used in alkyd and polyester resin synthesis. Among these are maleic, fumaric, phthalic, succinic, and sebacic acids. The unsaturated acids are used where it is desired to assist cross-linking with vinyl compounds like styrene, the saturated acids where this reaction is to be limited or where cross-linking is achieved by other means. In some cases monobasic acids are encountered, as when these are used as a method of controlling the polymerization or modifying the properties of the ultimate, cured resin.

It is, of course, possible to counteract the effect of acid by neutralizing with base or by condensing the acid with a suitable substance. This approach has many disadvantages, however, based mainly on the high concentration of free acid. For example, 100 grams of polyester resin with an acid number of 20 would, by definition, require 2.0 grams of KOH for neutralization. In terms of chemical equivalence, this quantity is far greater than that of the basic lead carbonate, since the quantity of crystals in 100 grams generally falls between 0.5 and 1.0 gram. The addition of this quantity of KOH or an equivalent quantity of any alkali runs the risk of adversely affecting the resin properties with respect to color, heat resistance, clarity, etc.

In accordance with the present invention, protection is imparted to the nacre-producing basic lead carbonate crystals by small additions of organic compounds of divalent metals, which form insoluble protective coatings on the crystals and are characterized by the structure—

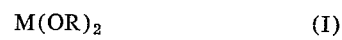

$$M(OR)_2 \qquad (I)$$

where M is the metal and R is a monofunctional organic group, or

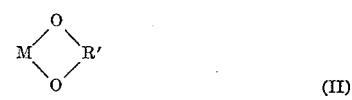

where R' is a bifunctional organic group. The additives are effective in very small concentrations and prevent the acid attack on the basic lead carbonate crystals. The metals which are suitable include Mg, Ca, Zn, Sr, Cd, Ba, Hg, Sn, Pb, Mn, Fe, Co and Ni. R may be derived from a carboxylic acid of one or more carbons, an alcohol with one or more carbons, a phenol, a naphthenic acid, an organic sulfate, an organic sulfonate or a phosphonate. R' may be derived from a dicarboxylic acid, a disulfate, a disulfonate, diphosphonate or a glycol.

Some of the metal compounds are of more limited value because of auxiliary properties. For example, the compounds Mn, Fe, Co and Ni tend to be dark in color, which limits their use to those colored pearl objects in which the color of the stabilizer is not objectionable. The non-colored substances are preferable in that they may be used in all circumstances.

Examples of effective compounds of Type I are magnesium stearate, cadmium naphthenate, calcium octoate, magnesium methylate, stannous lauryl sulfate, barium-acetate, and manganous phenate. Examples of Type II are magnesium phthalate, calcium maleate, and zinc succinate.

The present invention may be illustrated by comparing a resin not requiring stabilization of the basic lead carbonate, a resin which does require stabilization, and the effect of one of the stabilizers herein contemplated.

A 35 percent basic lead carbonate formulation consisting of

| | Percent |
|---|---|
| Basic lead carbonate crystals | 35 |
| Methyl Cellosolve (ethylene glycol monomethyl ether) | 19 |
| Selectron 5026 [1] | 10 |
| Dibutyl phthalate | 36 |
| | 100 |

[1] Selectron 5026 is a transparent, thermosetting polyester resin.

is dispersed, to the extent of 1.5 percent, in Selectron 5026. It is stored overnight at ambient temperature and is then catalyzed by the addition of 0.50 percent of a solution of 60 percent methylethyl ketone peroxide and 40 percent dimethyl phthalate. After the air bubbles have been discharged, the suspension is poured into a glass cell consisting of two glass sheets separated by a gasket 0.25 inch in thickness. The filled cell is immersed in a water bath at 70° C., and is subjected to a consistent vibratory or oscillatory motion during polymerization to insure proper orientation of the basic lead carbonate crystals parallel to the glass sheets. After 15 minutes, the cell is removed and opened, to yield a gelled polyester pearl sheet of high brilliance. The gelled sheet is finally cured by heating at 100° C. in an air oven for 60 minutes.

If the 35 percent basic lead carbonate formulation is dispersed, not in Selectron 5026, as described above, but in a modified resin made by adding 3 parts (by weight) of a 35 percent solution of maleic acid in methyl Cellosolve to 97 parts of Selectron 5026, the resulting gelled sheet has a dull white color instead of a brilliant pearl sheen, the crystals having been damaged during the overnight aging period and the subsequent heat cycle. This behavior is descriptive of that of many commercial polyester resins as received from the manufacturer, where the free acid is of such a nature that it damages basic lead carbonate crystals, although it is unobjectionable for the other uses for which the resin is recommended. Some of the other dicarboxylic acids which are components of polyester resins are less damaging to basic lead carbonates than maleic acid, succinic acid and adipic acid, for example, have relatively little effect when substituted for maleic acid in the above example.

To withstand the destructive effect, the 35 percent basic lead carbonate formulation may be modified as follows:

| | Percent |
|---|---|
| Basic lead carbonate crystals | 35 |
| Methyl Cellosolve | 19 |
| Selectron 5026 | 10 |
| Dibutyl phthalate | 26 |
| Magnesium stearate | 10 |
| | 100 |

The magnesium stearate is most conveniently added as a paste ground into twice its weight of dibutyl phthalate. The other components are all blended, including the dibutyl phthalate not used as vehicle for the stearate, and the magnesium stearate stabilizer is then added. This formulation, 1.5 percent of which is added to the maleic acid-Selectron 5026 mixture, gives a brilliant pearl sheet by the procedure described above.

Magnesium stearate is an effective stabilizer in concentrations of 2.5 to 20 percent in the 35 percent basic lead carbonate formulation. When this formulation is used at 1.5 percent in the polyester casting resin (the usual commercial range of concentration is 0.5 to 3.0 percent), the concentration of magnesium in 100 grams of final resin casting mixture is from 0.13 to 1.0 milliequivalents (meq.) per 100 grams. The polyester resin was modified, on the other hand, by the addition of 18.4 meq. of maleic acid to the 42 meq. of titratable acid already present per 100 grams in the resin which had an acid number of 24. It is clear that the stabilization does not depend on direct reaction with or neutralization of the free acid.

Other organic compounds of magnesium which are effective at concentrations similar to those for magnesium stearate are magnesium methylate, magnesium octoate, and magnesium naphthenate. Other effective compounds which are sufficiently colorless for general use are barium acetate, barium stearate, calcium isopropylate, calcium stearate, cadmium octoate, cadmium phenate, zinc stearate, strontium acetate, and mercuric laurate.

Stabilization can be achieved by the addition of these compounds to the resin prior to the dispersion of the basic lead carbonate crystals in the resin. However, considerably higher stabilizer concentrations are required with this order of addition. The direct addition of the stabilizer to the crystal suspension is, therefore, preferred.

Although we do not wish to be bound by a particular mechanism, it appears that the stabilizer is retained at the crystal surface in the form of a film which is water-insoluble and insoluble in the solvent or other medium in which the crystals are suspended. The crystals are thus provided with a protective sheath against the action of the free acid. This view is consistent with the effectiveness of very low concentrations of stabilizer against considerably larger concentrations of acid.

In the following examples, the basic lead carbonate is derived in each case from a concentrated master batch containing methyl Cellosolve and Selectron 5026. The latter component assists in the dispersion of the crystals, and neither it nor the methyl Cellosolve is an inherent part of this invention, since many other solvents and resinous substances, respectively, may be used with equal success.

*Example I*

A master batch containing—

| | Parts |
|---|---|
| Basic lead carbonate crystals | 35 |
| Methyl Cellosolve | 19 |
| Selectron 5026 | 10 |
| | 64 | and thus having a basic lead carbonate content of 54.7 percent, by weight, is made into the following formulation:

| | Percent |
|---|---|
| Basic lead carbonate master batch | 64 |
| Dioctyl phthalate | 29 |
| Cadmium naphthenate solution in mineral spirits (11% Cd) | 7 |
| | 100 |

The stability is demonstrated by incorporating and casting 1.5 percent of this formulation in the modified Selectron 5026 resin described above. A brilliant pearl sheet is obtained. The cadmium content is 0.20 meq. per 100 grams resin, or 0.38 meq. per gram basic lead carbonate crystals.

*Example II*

A 35 percent formulation of basic lead carbonate is made as follows:

| | Percent |
|---|---|
| Basic lead carbonate master batch, as in Example I | 64 |
| Dibutyl phthalate | 23 |
| Barium acetate monohydrate-dibutyl phthalate 1:2 (added as a paste) | 13 |
| | 100 |

The stability of this formulation is demonstrated as in Example I, with similar results. The barium content is 0.51 meq. per 100 grams resin, or 0.97 meq. per gram basic lead carbonate.

Example III

A 35 percent formulation of basic lead carbonate is prepared as follows:

| | Percent |
|---|---|
| Basic lead carbonate master batch, as in Example I | 64 |
| Dibutyl phthalate | 29 |
| Manganese octoate solution in mineral spirits (6% Mn) | 7 |
| | 100 |

The stability of this formulation is demonstrated as in Example I, with similar results. Since the manganese compound imparts a slight yellow color to the basic lead carbonate formulation, this stabilizer is restricted to applications in which the color is permissible, as in orange or brown pearl sheets. The manganese content is 0.23 meq. per 100 grams resin, or 0.43 meq. per gram basic lead carbonate.

Example IV

A 35 percent formulation of basic lead carbonate is prepared as follows:

| | Percent |
|---|---|
| Basic lead carbonate master batch, as in Example I | 64 |
| Dibutyl phthalate | 16 |
| Calcium phthalate-dimethyl phthalate 1:2 (as a paste) | 20 |
| | 100 |

The stability of this formulation is demonstrated as in Example I, with similar results. The calcium content is 1.1 meq. per 100 grams resin, or 2.1 meq. per gram basic lead carbonate.

Example V

A 35 percent formulation of basic lead carbonate is prepared as follows:

| | Percent |
|---|---|
| Basic lead carbonate master batch, as in Example I | 64 |
| Dibutyl phthalate | 6 |
| Barium stearate-dibutyl phthalate 1:2 (added as paste) | 30 |
| | 100 |

The stability of this formulation is demonstrated as in Example I, with similar results. The barium content is 0.50 meq. per 100 grams resin, or 0.95 meq. per gram basic lead carbonate.

Example VI

A 35 percent formulation of basic lead carbonate is prepared as follows:

| | Percent |
|---|---|
| Basic lead carbonate master batch, as in Example I | 64 |
| Dibutyl sebacate | 22 |
| Zinc phenate solution in mineral spirits (10% zinc) | 14 |
| | 100 |

The stability of this formulation is demonstrated as in Example I, with similar results. The zinc content is 0.64 meq. per 100 grams resin, or 1.2 meq. per gram basic lead carbonate.

Example VII

A 35 percent formulation of basic lead carbonate is prepared as follows:

| | Percent |
|---|---|
| Basic lead carbonate master batch, as in Example I | 64 |
| Dibutyl phthalate | 21 |
| Strontium octoate solution in mineral spirits (7% Sr) | 15 |
| | 100 |

The stability of this formulation is demonstrated as in Example I, with similar results. The strontium content is 0.36 meq. per 100 grams resin, or 0.69 meq. per gram basic lead carbonate.

Example VIII

A 35 percent formulation of basic lead carbonate is prepared as follows:

| | Percent |
|---|---|
| Basic lead carbonate master batch, as in Example I | 64 |
| Dibutyl phthalate | 15 |
| Co-precipitated mixture of barium-cadmium, phenate-octoate solution in mineral spirits (4% barium, 2% cadimum) | 21 |
| | 100 |

The stability of this formulation is demonstrated as in Example I, with similar results. The barium content is 0.20 meq. and the cadmium content 0.09 meq. per 100 grams resin, or 0.38 and 0.16 meq., respectively, per gram basic lead carbonate.

It is apparent in each example that stabilization has been imparted by a quantity of divalent metal-organic compound which ranges from 0.1 to 2.0 meq. per 100 grams resin. At the usual concentration of 1.5 percent of the 35 percent basic lead carbonate suspension, this is equivalent to 0.19 to 3.8 meq. divalent metal compound per gram basic lead carbonate. The stabilized basic lead carbonate formulations are effective not only at 1.5 percent, the standard concentration which has been used in the above examples, but over the entire range of 0.5 to 3.0 percent which has been usual in the commercial utilization of basic lead carbonate as a nacreous pigment.

The other components of the 35 percent formulations are of secondary importance, although they do have an influence on the final results, presumably because the degree of adsorption of the divalent metal-organic complexes to the crystal is influenced somewhat by the nature of the suspending vehicle. The solvents and plasticizers which have been shown are most useful in these formulations.

It is, of course, within the scope of this invention to use several stabilizers in combination. This procedure may involve two or more anions with the same cation, as barium acetate-barium stearate; two or more cations with one anion as calcium stearate-barium stearate; or two or more metal-organic compounds without any common component, as cadmium naphthenate-magnesium stearate.

In the foregoing, the invention has been described only in connection with preferred embodiments thereof. Many variations and modifications of the principles of the invention within the scope of the description herein are obvious. Accordingly, it is preferred to be bound not by the specific disclosure herein, but only by the appending claims.

We claim:

1. A nacreous pigment, having a nacre-producing substance therein, plate-like crystals of basic lead carbonate of less than 1 micron in thickness and from 5 to 50 microns in diameter, said crystals being stabilized against acid attack by having coated thereon a film of an organic compound of a divalent metal, said compound being selected from the group consisting of $M(OR)_2$, and

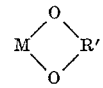

wherein M is a divalent metal, R is a monofunctional organic radical selected from the group consisting of monocarboxylic acid, alcohol, phenol, sulfate, sulfonate, and phosphonate radicals, and R' is a difunctional organic radical selected from the group consisting of dicarboxylic acid, disulfate, disulfonate, diphosphonate and glycol radicals.

2. The nacreous pigment of claim 1, in which said organic compound is coated on the nacre-producing substance in an amount of from 0.19 to 3.8 milliequivalents of the compound per gram of said substance.

3. The nacreous pigment of claim 1, in which the organic stabilizing agent is a salt of a divalent metal selected from the group consisting of Mg, Ca, Zn, Sr, Cd, Ba, Hg, Sn, Pb, Mn, Fe, Co and Ni.

4. A nacreous article of manufacture comprising nacre-producing plate-like crystals of basic lead carbonate of less than 1 micron in thickness and from 5 to 50 microns in diameter in a light-transmitting resin obtained by acid polymerization, said crystals being stabilized against acid attack by having coated thereon a film of an organic compound of a divalent metal selected from the group consisting of $M(OR)_2$ and

wherein M is a divalent metal, R is a monofunctional organic radical selected from the group consisting of monocarboxylic acid, alcohol, phenol, sulfate, sulfonate, and phosphonate radicals, and R' is a difunctional organic radical selected from the group consisting of dicarboxylic acid, disulfate, disulfonate, diphosphonate and glycol radicals.

5. The nacreous article of manufacture of claim 4, in which said organic compound is coated on the nacre-producing substance in an amount of from 0.19 to 3.8 milliequivalents of the compound per gram of said substance.

6. The nacreous article of manufacture of claim 4, in which the organic stabilizing agent is a salt of a divalent metal selected from the group consisting of Mg, Ca, Zn, Sr, Cd, Ba, Hg, Sn, Pb, Mn, Fe, Co and Ni.

7. A nacreous pigment, having as a nacre-producing substance therein, plate-like crystals of basic lead carbonate of less than 1 micron in thickness and from 5 to 50 microns in diameter, said crystals being stabilized against acid attack by having coated thereon a film of a co-precipitated mixture of a barium-cadmium, phenate-octoate solution.

8. A nacreous pigment, having as a nacre-producing substance therein, plate-like crystals of basic lead carbonate of less than 1 micron in thickness and from 5 to 50 microns in diameter, said crystals being stabilized against acid attack by having coated thereon a film of magnesium stearate.

9. A nacreous pigment, having as a nacre-producing substance therein, plate-like crystals of basic lead carbonate of less than 1 micron in thickness and from 5 to 50 microns in diameter, said crystals being stabilized against acid attack by having coated thereon a film of cadmium naphthenate.

10. A nacreous pigment, having as a nacre-producing substance therein, plate-like crystals of basic lead carbonate of less than 1 micron in thickness and from 5 to 50 microns in diameter, said crystals being stabilized against acid attack by having coated thereon a film of barium acetate.

11. A nacreous pigment, having as a nacre-producing substance therein, plate-like crystals of basic lead carbonate of less than 1 micron in thickness and from 5 to 50 microns in diameter, said crystals being stabilized against acid attack by having coated thereon a film of calcium octoate.

12. A nacreous pigment, having as a nacre-producing substance therein, plate-like crystals of basic lead carbonate of less than 1 micron in thickness and from 5 to 50 microns in diameter, said crystals being stabilized against acid attack by having coated thereon a film of magnesium octoate.

13. A nacreous pigment having as a nacre-producing substance therein, plate-like crystals of basic lead carbonate of less than 1 micron in thickness and from 5 to 50 microns in diameter, said crystals being stabilized against acid attack by having coated thereon a film of calcium phthalate.

14. A nacreous pigment having as a nacre-producing substance therein, plate-like crystals of basic lead carbonate of less than 1 micron in thickness and from 5 to 50 microns in diameter, said crystals being stabilized against acid attack by having coated thereon a film of barium stearate.

15. A nacreous pigment having as a nacre-producing substance therein plate-like crystals of basic lead carbonate of less than 1 micron in thickness and from 5 to 50 microns in diameter, said crystals being stabilized against acid attack by having coated thereon a film of zinc phenate.

16. A nacreous pigment having as a nacre-producing substance therein plate-like crystals of basic lead carbonate of less than 1 micron in thickness and from 5 to 50 microns in diameter, said crystals being stabilized against acid atack by having coated thereon a film of strontium octoate.

References Cited by the Examiner

UNITED STATES PATENTS 3,008,844  11/1961  Grunin _____ 106—291
3,025,179  3/1962  Holbein _____ 106—308

HELEN M. McCARTHY, *Primary Examiner.*

TOBIAS E. LEVOW, *Examiner.*

J. E. POER, S. E. MOTT, *Assistant Examiners.*